(12) United States Patent
Mochizuki

(10) Patent No.: US 6,910,564 B2
(45) Date of Patent: Jun. 28, 2005

(54) TOOTHED ELECTROMAGNETIC CLUTCH BRAKE

(75) Inventor: Manabu Mochizuki, Tokyo (JP)

(73) Assignee: Minebea Co., Ltd., Miyota Machi (JP)

( * ) Notice: Subject to any disclaimer, the term of this patent is extended or adjusted under 35 U.S.C. 154(b) by 0 days.

(21) Appl. No.: 10/449,964

(22) Filed: May 30, 2003

(65) Prior Publication Data
US 2004/0035665 A1 Feb. 26, 2004

(30) Foreign Application Priority Data
Jun. 6, 2002 (JP) .......................... 2002-165562

(51) Int. Cl.[7] .............................................. F16D 27/09
(52) U.S. Cl. .................... 192/84.92; 192/69.8; 192/108; 29/602.1
(58) Field of Search .......................... 192/84.92, 84.96, 192/90, 69.8, 108; 188/161, 163, 164; 29/596, 598, 602.1, 893.33, DIG. 37; 335/279, 281

(56) References Cited

U.S. PATENT DOCUMENTS

| 1,756,907 A | * | 4/1930 | Payne ..................... 192/84.91 |
| 1,847,926 A | * | 3/1932 | Chase ..................... 29/893.33 |
| 3,672,042 A | * | 6/1972 | Jaeschke ..................... 29/602.1 |
| 4,010,832 A | * | 3/1977 | Puro ....................... 192/84.92 |
| 4,346,616 A | * | 8/1982 | Geisslinger et al. ... 192/84.961 |
| 5,035,310 A | * | 7/1991 | Meyerle ..................... 192/48.5 |

FOREIGN PATENT DOCUMENTS

JP 2000117344 A * 4/2000 ............ B21D/28/16

* cited by examiner

Primary Examiner—Richard M. Lorence
(74) Attorney, Agent, or Firm—Schulte Roth & Zabel LLP; Joel E. Lutzker; Anna Vishev

(57) ABSTRACT

A rotor ring and an armature for use in a toothed electromagnetic clutch or a toothed electromagnetic clutch brake. A method of manufacturing rotor rings and armatures used in toothed electromagnetic clutch or a toothed electromagnetic clutch brakes.

20 Claims, 6 Drawing Sheets

TOOTHED ELECTROMAGNETIC CLUTCH BRAKE

This application claims priority from (Japanese) Patent Application No. 2002-1655562 filed on Jun. 6, 2002.

BACKGROUND OF THE INVENTION

The rotating portion of an electric motor has angular momentum and kinetic energy during the motor's operation. Since both angular momentum and energy must be conserved, the rotating portion of the motor will continue to rotate until the angular momentum is transferred to other objects and the energy is dissipated. However, for a variety of applications using electric motors, it is advantageous to bring a motor, including its rotating shaft, to a prompt stop rather than allowing it to coast to a stop. Toothed electromagnetic clutch brakes are often employed for this purpose. A toothed electromagnetic clutch brake is a motor stopping device that utilizes a toothed electromagnetic clutch to transfer the motor's angular momentum and energy to an armature assembly that is sufficiently secured to a fixed structure to promptly stop the shaft's rotation.

Toothed electromagnetic clutches transmit angular momentum and energy through the use of interlocking teeth. In general, toothed electromagnetic clutches are comprised of an armature assembly, a rotor, and a coil. The rotor is coupled to a shaft that is driven by an electric motor or other similar device such that the rotor rotates with the shaft. The armature assembly may be enabled to rotate about the same axis as the rotor ring. Additionally, the armature assembly and the rotor possess mutually interlocking teeth. Further, the toothed portions of the armature assembly and the rotor are capable of relative axial movement such that when the coil is energized to create a magnetic field the toothed portions of the armature assembly and the rotor to come together. When the armature assembly and rotor come together, their teeth interlock causing the rotor to apply torque to the armature assembly. The application of this torque transmits energy and angular momentum from the rotor to the armature assembly. During engagement, which is when the toothed portions of the armature assembly and the rotor come together, toothed electromagnetic clutches unfailingly allow the rotor to apply compact, high torque to the armature assembly without the occurrence of slippage. During disengagement, toothed electromagnetic clutches unfailingly prevent the application of torque without the occurrence of entanglement.

A toothed electromagnetic clutch brake is a motor stopping device that utilizes an electromagnetic clutch to transfer the angular momentum and kinetic energy associated with a de-energized electric motor to an armature assembly that is sufficiently secured to a fixed structure to promptly stop the shaft's rotation.

In prior art toothed electromagnetic clutches, the toothed portion of the armature assembly ("the armature") and the toothed portion of the rotor ("the rotor ring") are either machined, or they are manufactured by powder metallurgical methods using sintered metal. Both of these methods have problems associated with them.

Machining of armatures and rotor rings, which is usually accomplished through the use of a one-reed hob, milling cutter, involute pinion cutter, or the like, is a time intensive and resultantly expensive process, since numerous processes are required to form the tooth flanks. Additionally, it is difficult to guarantee the dividing accuracy of the interlocking teeth and machining defects tend to occur. These problems are magnified when the number of interlocking teeth is large.

Manufacturing armatures and rotor rings through the use of powder metallurgical methods is less expensive and time consuming than machining them. However, the resulting materials are not as tough as the machined armatures and rotor rings, and it is difficult to guarantee the mechanical strength of the teeth. Moreover there is a major impact on product life and manufacturing cost due to the density and durability of the materials.

SUMMARY OF THE INVENTION

It is therefore an object of the present invention to guarantee the necessary mechanical properties and to reduce manufacturing costs with regard to the armature and rotor ring in a toothed electromagnetic clutch and in a toothed electromagnetic clutch brake.

These and other advantages are obtained when the rotor ring and armature are formed by stamping in accordance with the present invention. Stamping allows the mass production of rotor rings and armatures by metal dies using rolled steel sheet. Accordingly, manufacturing costs can be reduced. Additionally, it becomes easy to obtain the desired properties with regard to accuracy of tooth flank, mechanical strength, magnetic properties and so on. Moreover, the rotor ring and armature parameters, including the number of teeth, the pressure angle of the teeth, the number and shape of the U-shaped grooves and so on; can be arbitrarily set, and it is possible to conduct wide-ranging adjustments corresponding to clutch capacity, application, and the like.

An embodiment of the present invention comprises a rotor ring for use in an electromagnetic clutch, wherein the rotor ring is formed by stamping.

An embodiment of the present invention comprises an armature for use in an electromagnetic clutch, wherein the armature is formed by stamping.

A toothed electromagnetic clutch embodying the present invention comprises an armature assembly having a stamped armature, a rotor having a stamped rotor ring, and a coil that generates an electromagnetic field. When an electromagnetic field is generated by the coil, the armature and the rotor ring come together and their teeth mutually interlock.

A toothed electromagnetic clutch brake embodying the present invention comprises an armature assembly having a stamped armature, a rotor having a stamped rotor, ring, and a coil that generates an electromagnetic field. Additionally, the rotor is coupled to the rotating portion of a motor and the armature assembly is secured to a non-rotating structure. When an electromagnetic field is generated by the coil, the armature and the rotor ring come together and their teeth mutually interlock.

A method of manufacture in accordance with the present invention is characterized by a process of forming a rotor ring by stamping a blank of metal sheet to form a ring having a plurality of teeth.

A method of manufacture in accordance with the present invention is characterized by a process of forming an armature by stamping a blank of metal sheet to form a ring having a plurality of teeth.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
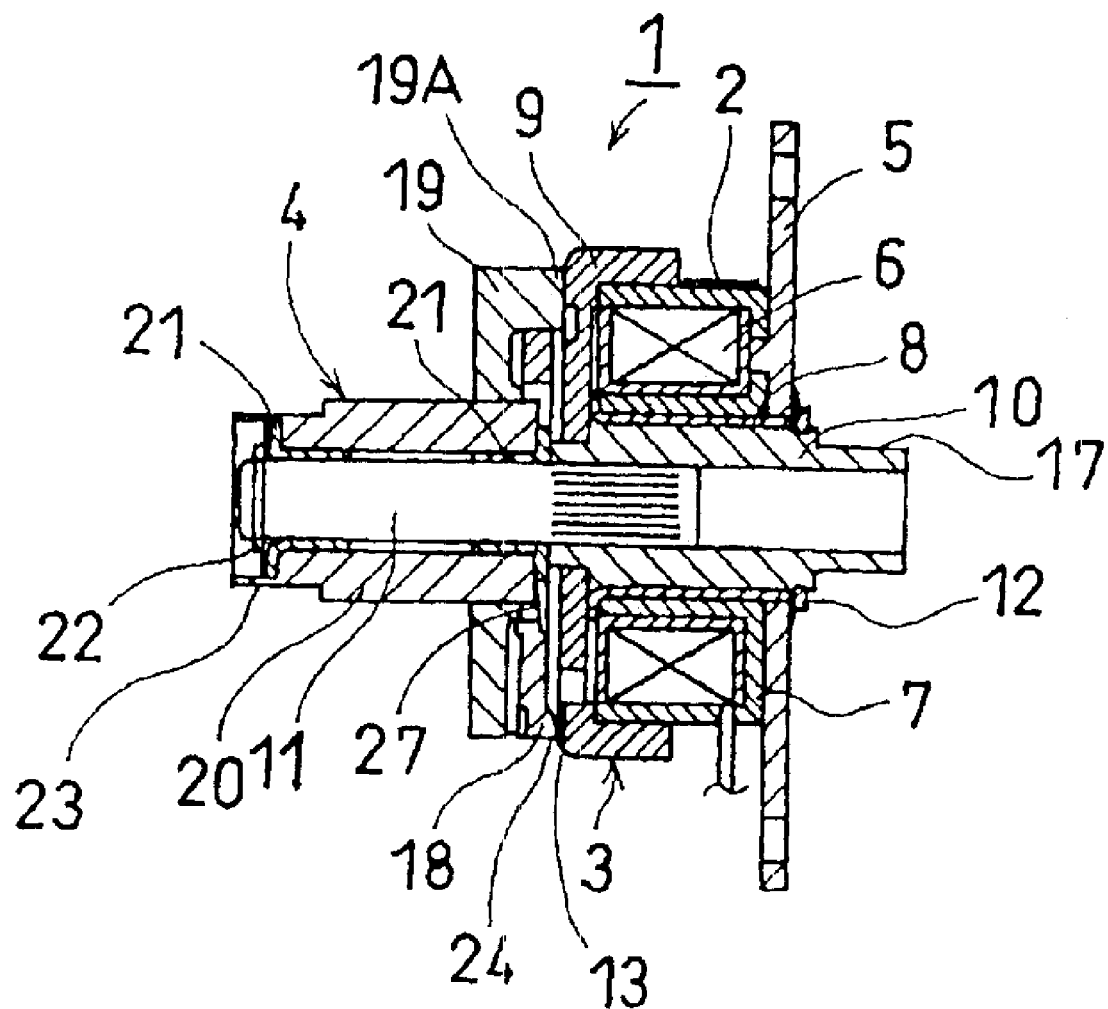
FIG. 1 is a longitudinal section view of a toothed electromagnetic clutch according to one embodiment of this invention.

One embodiment of a toothed electromagnetic clutch embodying the present invention is shown in FIG. 1. Toothed electromagnetic clutch 1 is comprised of field coil 2, rotor 3, and armature drive 4. Rotor 3 is connected to a rotating shaft of an electric motor.

As shown in FIG. 1, field coil 2 is comprised of baseboard 5, coil 6, housing 7, and bushing 8. Housing 7 accommodates coil 6, which is ring shaped. Baseboard 5 allows field coil 2 to be attached to an external frame or device, and bushing 8 connects field coil 2 to rotor 3 so as to allow relative rotation between field coil 2 and rotor 3.

Figure 2:
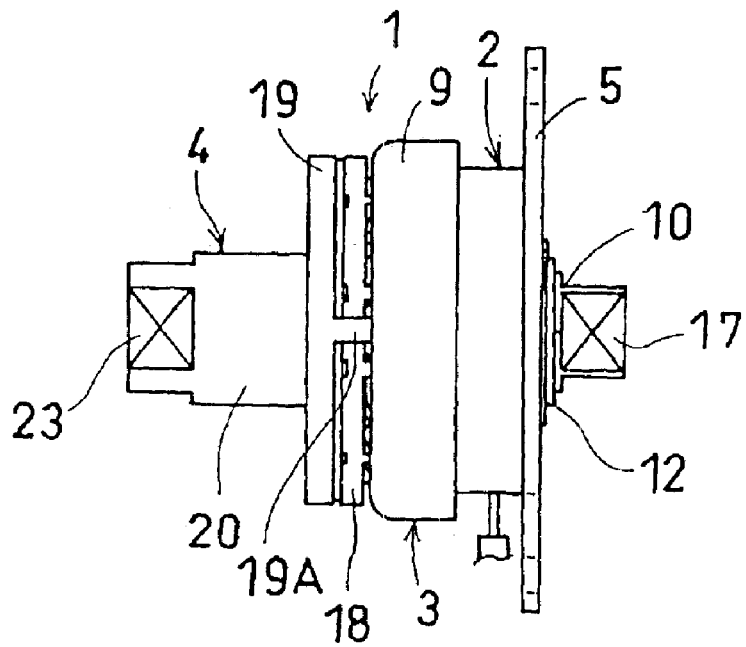
FIG. 2 is a lateral view of a toothed electromagnetic clutch according to one embodiment of this invention.
Figure 4:
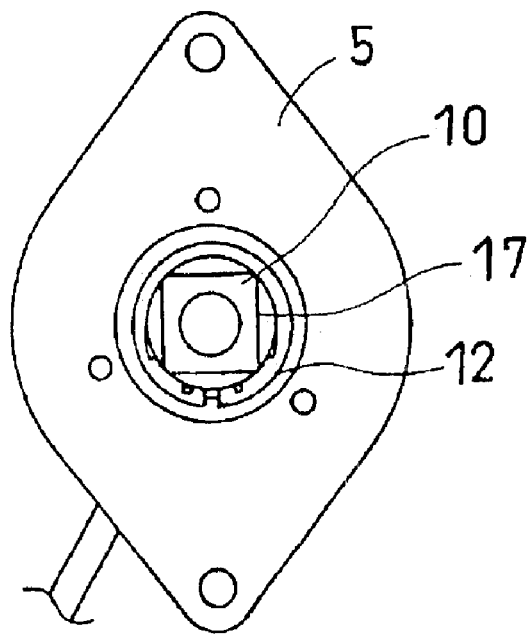
FIG. 4 is a rear view of a toothed electromagnetic clutch according to one embodiment of this invention.

As shown in FIGS. 1, 2, and 4, rotor 3 is comprised of cylindrical rotor ring 9, shaft 10, support shaft 11, snap ring 12, and rectangular coupler 17. Cylindrical rotor ring 9 extends over the outer periphery of housing 7, which is part of field coil assembly 2, with a specified clearance. Additionally, cylindrical rotor ring 9 includes rectangular aperture 16 by which it is fixedly attached to a rectangular portion of shaft 10. Shaft 10 extends through bushing 8. A cylindrical portion of shaft 10 and bushing 8 form a bearing that allows shaft 10 to be rotatably supported by field coil 2. Shaft 10 is fixed in the axial direction by the snap ring 12. Support shaft 11, which extends into armature drive 4, is press fit into one side of shaft 10. Rectangular coupler 17 is formed on the other side of shaft 10. A rotating shaft (not shown) of a motor or similar device connects to shaft 10 through the use of rectangular coupler 17. Accordingly, rotor ring 9, shaft 10, and support shaft 11 rotate with the rotating shaft (not shown).

Figure 5:
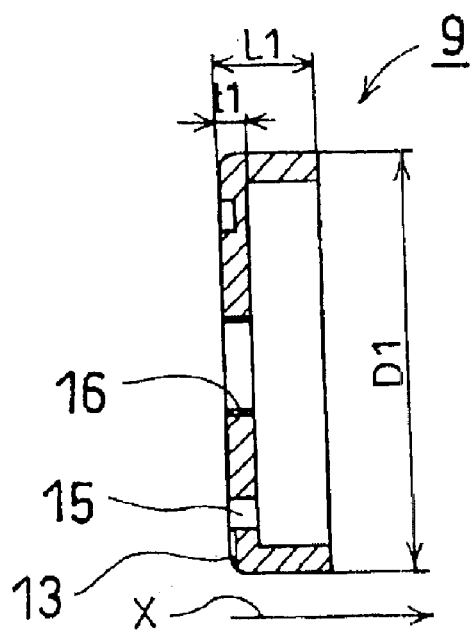
FIG. 5 is longitudinal section view, which corresponds to line A—A as shown in FIG. 6, of a rotor ring according to one embodiment of this invention.
Figure 6:
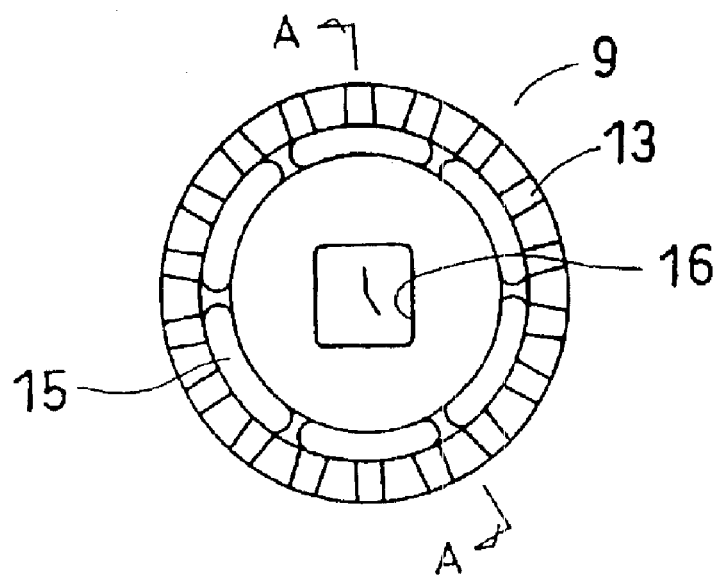
FIG. 6 is a frontal view of a rotor ring according to one embodiment of this invention.
Figure 7:
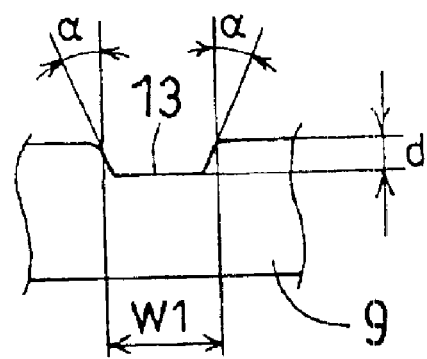
FIG. 7 is a view showing an enlargement of the interlocking indentations of the rotor ring shown in FIG. 5.

As shown in FIG. 5 to FIG. 7, eighteen interlocking indentations 13 are uniformly arranged at a central angle of 20° in the circumferential direction on the outer periphery of the outside end face of the bottom part of rotor ring 9, forming annular teeth. On the inner periphery of the annular teeth (interlocking indentations 13), six arc-shaped long holes 15 are uniformly arranged at a central angle of 60° in the circumferential direction. Additionally, rectangular aperture 16 is formed at the center of the bottom part of rotor ring 9.

In the preferred embodiment, rotor ring 9 is formed by press working ("stamping") a 3.2 mm thick blank of cold rolled steel sheet (SPCE-SD), which is used for deep drawing. The arrow mark X shown in FIG. 5 indicates the punching direction of long holes 15 and aperture 16. Moreover, the surface of rotor ring 9 is hardened through the use a gas nitrocarbonizing method. As shown in FIG. 5, rotor ring 9 has the following dimensions: sheet thickness t1=3.2 mm, diameter D1=50 mm, axial measurement L1=12.3 mm. Additionally, as shown in FIGS. 6 and 7, rotor ring 9 includes eighteen interlocking indentations 13 that have the following dimensions: width W1=2.8 mm, depth d=0.8 mm, and pressure angle α=23°.

Figure 3:
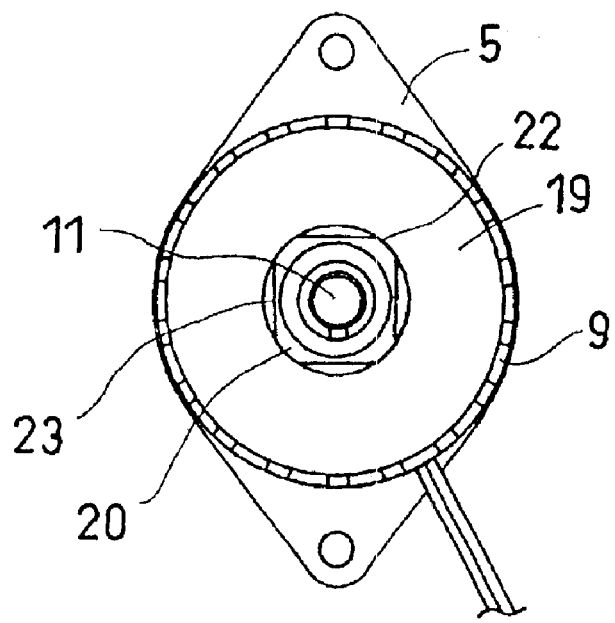
FIG. 3 is a frontal view of a toothed electromagnetic clutch according to one embodiment of this invention.
Figure 8:
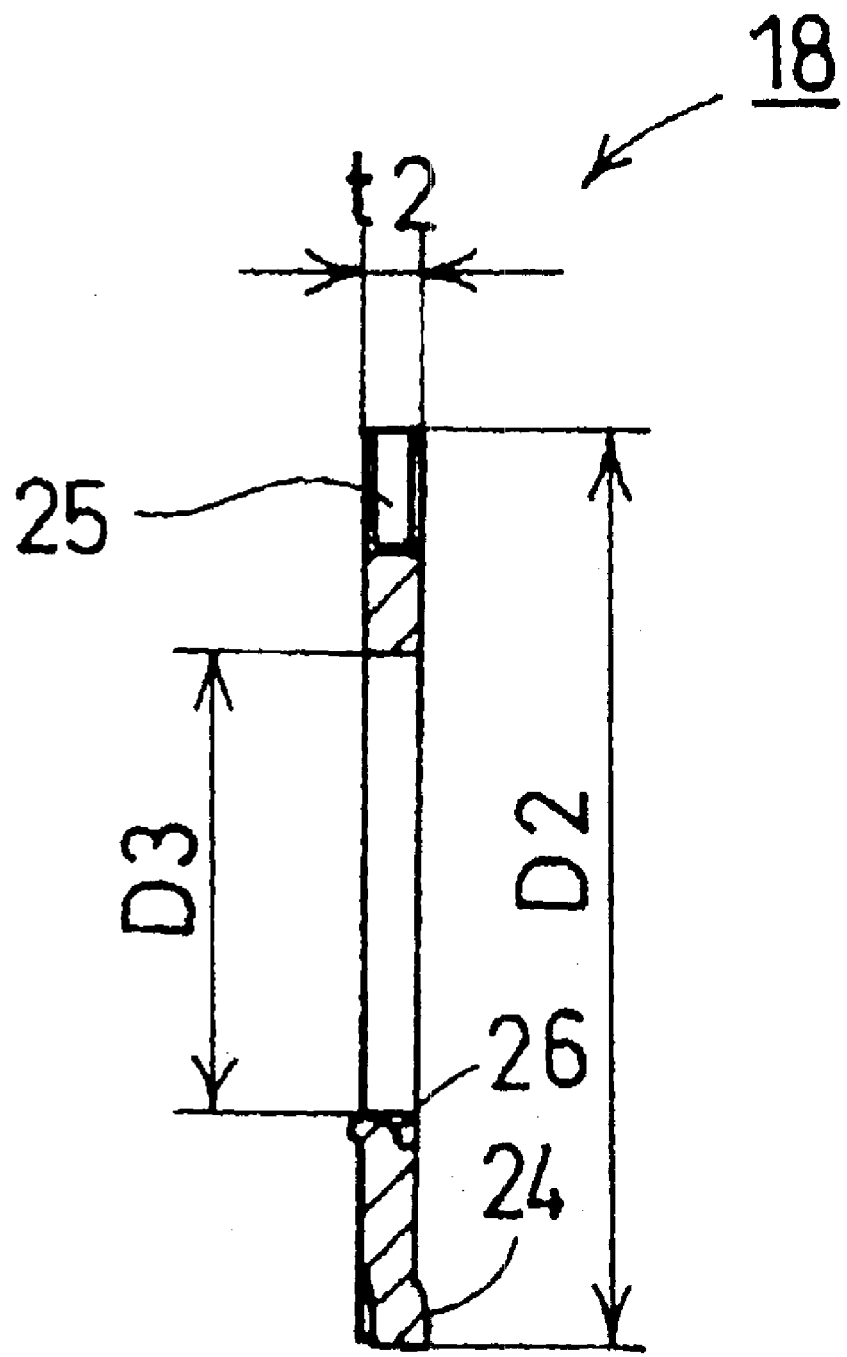
FIG. 8 is a longitudinal section view of an armature according to one embodiment of this invention
Figure 9:
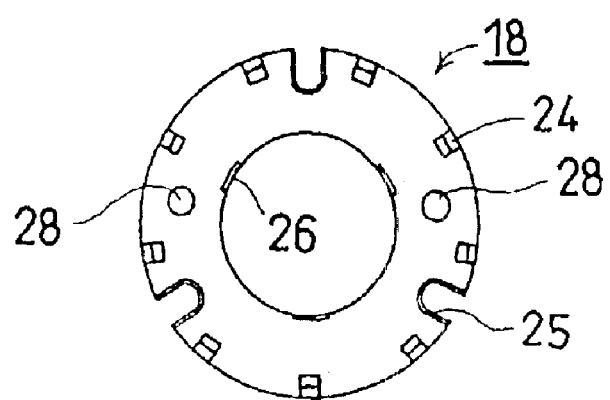
FIG. 9 is a frontal view of the armature shown in FIG. 8.
Figure 10:
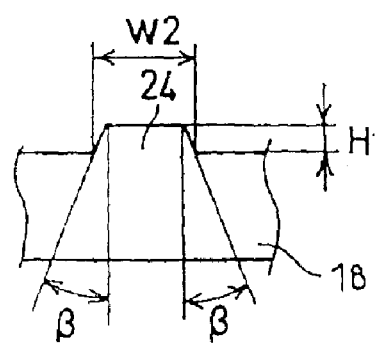
FIG. 10 is a view showing an enlargement of the interlocking protuberances of the armature shown in FIG. 8

As shown in FIGS. 1, 2, and 3, armature drive 4 comprises ring-shaped armature 18, guide ring 19, cylindrical sleeve 20, bushing 21, snap ring 22, and clutch spring 27. Ring-shaped armature 18 faces opposite rotor ring 9. Guide ring 19 is affixed to and arranged behind armature 18 and it is affixed to cylindrical sleeve 20. Support shaft 11, which is part of rotor 3, is inserted in sleeve 20 via bushing 21 such that it is capable of rotating. Snap ring 22 fixes support shaft 11 in the axial direction. Spring 27 serves to keep ring shaped armature 18 away from rotor ring 9 when coil 6 is not energized. Rectangular coupler 23 is formed on the end of cylindrical sleeve 20 that is opposite to guide ring 19. Rectangular coupler 23 may be attached to a rotating shaft or if toothed electromagnetic clutch 1 is being used as a brake, then rectangular coupler 23 will be attached to a non rotating structure As shown in FIG. 8 to FIG. 10, nine interlocking protuberances 24 are uniformly arranged in the circumferential direction at a central angle of 40° on the surface of armature 18 that faces rotor ring 9, forming annular teeth. The nine interlocking protuberances 24 (annular teeth) are capable of engaging with the eighteen interlocking indentations 13 (annular teeth), which are formed on rotor ring 9. Three U-shaped grooves 25 are uniformly arranged at a central angle of 120° between interlocking protuberances 24 on the outer periphery of armature 18. Additionally, Guide claws 19A, which project from guide ring 19, fit into U-shaped grooves 25 and cause guide ring 19 to rotate with armature 18. Armature 18 can slide axially along guide claws 19A. Spring seat 26 is formed at the inner periphery edge part of armature 18. Clutch spring 27 engages with spring seat 26 to ordinarily maintain armature 18 away from the rotor ring 9 by the spring force. Guide holes 28 are provided in the armature 18 for the purpose of positioning U-shaped grooves 25 on guide claws 19A during assembly.

In the preferred embodiment, armature 18 is formed by press working ("stamping") a 2.8 mm thick blank of cold rolled steel sheet (SPCE-SD), which is used for deep drawing. The armature 18 can, for example, be formed by the following type of stamping processes: (1) the annular blank is formed; (2) nine interlocking protuberances 24 and three spring seats 26 are formed in the blank; (3) three U-shaped grooves 25 and guide holes 28 are formed; (4) the inner surface of the U-shaped grooves 25 are formed; (5) the inner surface of the U-shaped grooves 25 are finished by surface pressing. Furthermore, surface-hardening treatment is conducted by the gas nitrocarbonizing method.

As shown in FIG. 8, armature 18 has the following dimensions: sheet thickness t2=2.8 mm, outer diameter D2=46 mm, bore diameter D3=24 mm. Additionally, as shown in FIGS. 9 and 10, armature 18 includes nine interlocking protuberances 24 that have the following dimensions: width W2=2.6 mm, height H=0.7 mm, pressure angle β=23°.

The operation of toothed electromagnetic clutch is described with reference to FIG. 1. When coil 6 is energized, armature 18 is attracted towards rotor ring 9 by an electromagnetic force that is greater than the spring force of clutch spring 27. Armature 18 slides along guide claws 19A until it is united with the rotor ring 9. The nine interlocking protuberances 24 on armature 18 mesh with the eighteen interlocking indentations 13 on rotor ring 9. Interlocking indentations 13 apply torque to interlocking protuberances 24 thereby transmitting angular momentum and energy from rotor 3, including the kinetic energy and momentum of any rotating shaft or motor coupled to rotor 3 by rectangular coupler 17, to armature drive 4. Armature drive 4, in turn, transmits energy and momentum to any rotating shaft or non-rotating structure coupled to armature drive 4 through rectangular coupler 23. When the nine interlocking protuberances 24 are meshed with the eighteen interlocking indentations 13, there is no occurrence of slippage between armature 18 and rotor ring 9. Accordingly, torque can be unfailingly applied.

When coil 6 is deenergized, the electromagnetic field dissipates and an electromagnetic force is no longer applied to armature 18. The spring force applied by clutch spring 27 causes armature 18 to move away from rotor ring 9. Accordingly, Interlocking indentations 13 can no longer apply torque to interlocking protuberances 24 and the transmission of angular momentum and energy is blocked. Since interlocking protuberances 24 and the interlocking indentations 13 are unfailingly separated by the spring force of clutch spring 27 when coil 6 is deenergized, the application of torque can be unfailingly blocked without the occurrence of entanglement.

The drawings and descriptions of the preferred embodiment are made by way of example rather than to limit the scope of the inventions, and the claims are intended to cover all variations and modifications within the spirit and scope of the inventions. For example, the teeth on rotor ring 9 could be protuberances and the teeth on an armature 18 could be indentations. Additionally, clutch spring 27 could be configured to apply a spring force that pushes armature 18 towards rotor ring 9 and field coil 2 could be positioned on armature drive 4 to apply an electromagnetic force that pulls armature 18 away from rotor ring 9 such that armature 18 and rotor ring 9 unite when coil 6 is deenergized.

What is claimed is:

1. A rotor ring for use in an electromagnetic clutch comprising:
   a metallic ring having a flat surface with an outer perimeter; and
   a plurality of teeth formed by stamping, wherein said plurality of teeth are placed uniformly along said outer perimeter of said metallic ring, and wherein said plurality of teeth comprises indentations in said metallic ring.

2. The rotor ring of claim 1 wherein:
   said metallic ring includes a central aperture.

3. The rotor ring of claim 1 wherein:
   said metallic ring includes a plurality of arc-shaped long holes that are placed uniformly on said flat surface internal to and adjacent to said plurality of teeth.

4. The rotor ring of claim 3 further comprising:
   a cylindrical surface integral to and extending from said outer perimeter of the flat surface of the metallic ring.

5. The rotor ring of claim 4 wherein:
   said metallic ring has a diameter equal to 50 millimeters;
   said metallic ring has a thickness equal to 3.2 millimeters; and
   said cylindrical surface has a height of 12.3 millimeters.

6. The rotor ring of claim 1 wherein:
   said indentations have a depth equal to 0.8 millimeters, a width equal to 2.8 millimeters, and a pressure angle equal to 23 degrees.

7. A method of manufacturing a rotor ring comprising the step of:
   stamping a ring shaped blank of metal to form teeth on said blank, wherein said blank comprises a flat surface, wherein said teeth are placed uniformly along an outer perimeter of said flat surface, and wherein said teeth comprise indentations in said blank.

8. The method of claim 7 further comprising the step of:
   surface hardening said ring shaped blank after it has been stamped.

9. An armature for use in an electromagnetic clutch comprising:
   a metallic ring having a flat surface with an outer perimeter and a circular central aperture; and
   a plurality of teeth formed by stamping, wherein said plurality of teeth are placed uniformly alone said outer perimeter of said metallic ring, wherein said plurality of teeth comprises indentations in said metallic ring, and wherein said metallic ring includes two holes that are placed uniformly on said flat surface internal to said plurality of teeth.

10. An armature for use in an electromagnetic clutch comprising:
    a metallic ring having a flat surface with an outer perimeter and a circular central aperture;
    a plurality of teeth formed by stamping, wherein said plurality of teeth are placed uniformly along said outer perimeter of said metallic ring, and wherein said plurality of teeth comprises indentations in said metallic ring; and
    a plurality of U-shaped openings are uniformly placed along the outer perimeter of the flat surface of the metallic ring in between teeth of said plurality of teeth.

11. The armature of claim 9 or 10 wherein:
    said metallic ring has a diameter equal to 46 millimeters;
    said metallic ring has a thickness equal to 2.8 millimeters; and
    said central aperture has a diameter of 24 millimeters.

12. The armature of claim 9 or 10 wherein:
    said plurality of teeth further comprises of protuberances from said metallic ring.

13. The armature of claim 12 wherein:
    said protuberances have a depth equal to 0.7 millimeters, a width equal to 2.6 millimeters, and a pressure angle equal to 23 degrees.

14. A method of manufacturing an armature comprising the step of:
    stamping a ring shaped blank of metal to form teeth on said blank, wherein said blank comprises a flat surface having a circular central aperture, wherein said teeth are placed uniformly along an outer perimeter of said flat surface and comprise indentations in said blank, and wherein said blank includes two holes that are placed uniformly on said flat surface internal to said teeth.

15. The method of claim 14 further comprising the step of:
    surface hardening said ring shaped blank after it has been stamped.

16. A method of manufacturing an armature comprising the steps of:
    (1) forming an annular blank;
    (2) stamping nine protuberances and three spring seats in the blank;
    (3) stamping three U-shaped grooves and two guide holes in the blank;

(4) finishing the inner surface of the U-shaped grooves by surface pressing.

(5) surface hardening the annular blank.

17. The method of claim 16 wherein the annular blank is comprised of cold rolled steel sheet.

18. A toothed electromagnetic clutch comprising:

an armature assembly having a stamped armature, wherein said armature comprises a surface with an outer perimeter, a circular central aperture, and a plurality of teeth, wherein said plurality of teeth are placed uniformly along said outer perimeter of said metallic ring, wherein said plurality of teeth comprises indentations in said metallic ring, and wherein said metallic ring includes two holes that are placed uniformly on said flat surface internal to said plurality of teeth;

a rotor having a stamped rotor ring, wherein said rotor ring comprises a flat surface with an outer perimeter having a plurality of teeth placed uniformly along said outer perimeter, and wherein said plurality of teeth are indentations in said rotor ring; and a field coil.

19. The toothed electromagnetic clutch of claim 18 wherein:

said stamped armature has a plurality of protuberances; and said stamped rotor ring has a plurality of indentations.

20. The toothed electromagnetic clutch of claim 18, wherein said armature assembly is coupled to a non-rotating structure.

* * * * *